April 2, 1968     P. B. ZIMMERER ET AL     3,376,052

IRRIGATION PIPE COUPLER

Filed Feb. 24, 1966

INVENTORS
PAUL B. ZIMMERER
BERNARD J. ZIMMERER
ARTHUR L. ZIMMERER

United States Patent Office 3,376,052
Patented Apr. 2, 1968

3,376,052
IRRIGATION PIPE COUPLER
Paul B. Zimmerer, Bernard J. Zimmerer and Arthur L. Zimmerer, all of Lindsay, Nebr. 68644
Filed Feb. 24, 1966, Ser. No. 529,711
1 Claim. (Cl. 285—5)

ABSTRACT OF THE DISCLOSURE

An irrigation pipe and coupler assembly in which one end of the coupler tube and a pipe therein are connected by an attachment assembly on the right side of the tube and an attachment assembly on the left side of the tube, each assembly having a connection portion permanently attached to the tube and another connection portion permanently attached to the pipe, the connection portions having aligned apertures receiving a pin removably disposed therethrough for rapid connection and disconnection of the coupler tube and the pipe, an annular riser connection section on the top side of the tube, the bottom side of the tube being free of such connection assemblies.

Comparison with prior art

With prior art couplers the handling of a pipe with respect to its coupler would seriously destroy the shape of the pipe and its sealing with the coupler. This was because the pipe-to-coupler connecting assemblies of the prior art connected only one side of a pipe to its coupler. An example of this is the German Patent 957,176 issued in Jan. of 1957; this patent has its single connector on the top of the pipe where it cannot protect against an upward tilting nor even against a downward tilting of one end of one of the pipes as would bend that pipe, destroying the sealing effect and causing a fast leakage. Such bending forces are resisted in our coupling assembly by providing long vertical bearing surfaces along pins on both the right and the left hand sides of the pipe, both right hand and left hand connection assemblies being fixed not only to the pipe but also to the coupler, as is not the case in the said German patent.

Similar disadvantages of connection on only one side are found in U.S. Patent 2,677,560 issued to G. Cornelius May 24, 1954, and titled Sealing and Self-Draining Means for Pipe Couplers.

In the prior art, couplers have, for the most part, been formed of heavy castings and the attachment thereto of sprinkler riser connection fittings has special problems when the coupler tubes is formed more economically of material of the same thickness throughout and it is an object to provide means for bracing such a fitting to make practical the use of a thinner tubular body of the same thickness throughout.

Other and further objects and advantages of the present invention will be apparent from the following detailed description, drawings and claim, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and purview of the appended claim.

Figure 1:
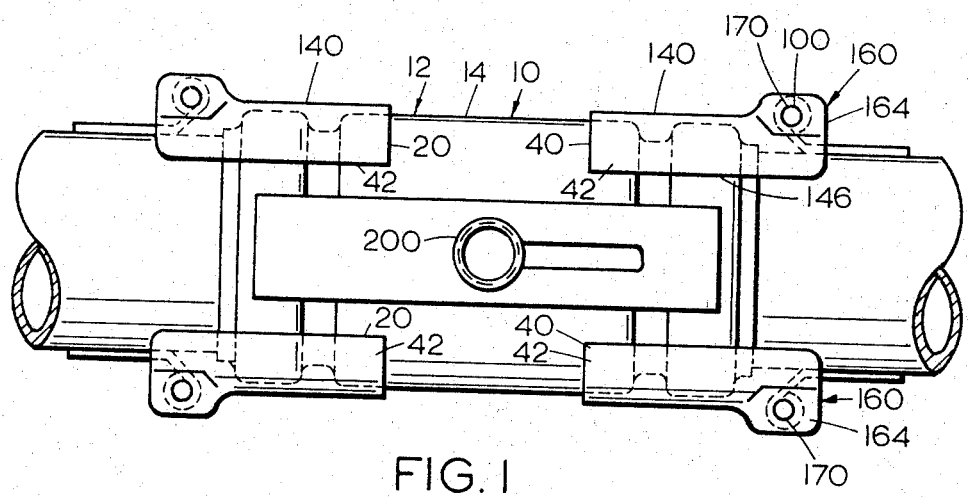
FIGURE 1 is a top plan view of a coupler and pipe assembly showing the ends of two pipes.
Figure 2:
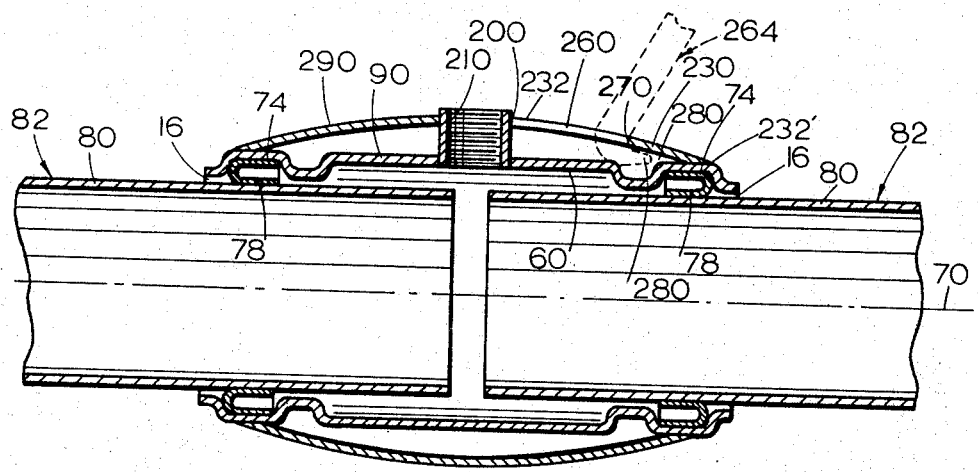
FIGURE 2 is a vertical section of the coupler and pipe assembly showing the end of the handling hook.

The irrigation assembly of this invention is generally indicated at 10 in FIGURE 1 and comprises a coupler generally indicated at 12 comprising a tube 14 having opened ends 16, best seen in FIGURE 2.

The tube 14 has two pairs 20 and 40 of attachment elements 42, each pair being attached to a different end of the tube 14. The attachment elements 42 of each of the pairs being attached one to the right-hand and one to the left-hand side of the tube 14, respectively.

The tube 14 has an inner surface 60 which is symmetrical about an axis 70 extending from one end of the tube to the other end.

The tube has two annular recesses 74 in its inner wall disposed at each end of the inner wall 60. The recesses 74 have walls which are symmetrical about the axis 70.

A pair of annular gaskets 78 are received in each of the recesses 74 whereby ends 80 of two irrigation pipes 82 can be inserted through ends of the tube 14 engaging the gaskets.

The outer wall 90 of the tube is best seen to be of substantially the same thickness throughout the length of the tube. This makes it possible to manufacture the tube from a single piece of extruded pipe stock of cylindrical shape by means of later shaping processes for forming the recesses 74, thus providing speed of manufacture and economy.

This method also achieves manufacture with a lesser amount of material than can be accomplished by casting.

Figure 3:
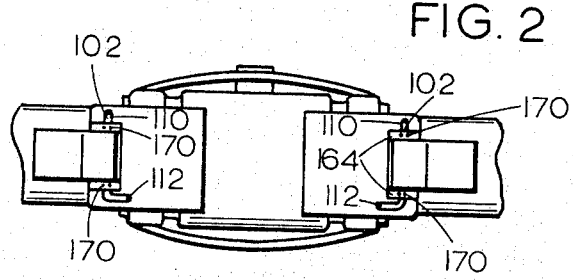
FIGURE 3 is a side elevation of the coupler and pipe assembly.

The attaching elements 42 each have a substantially vertical opening 100 therethrough for receiving a connection pin 102, best seen in FIGURE 3. The connection pins 102 have shank portions 110 and offset end portions 112, which latter are normally on the upper side of the attachment element 42, but for convenience of illustration, are shown on the lower side in FIGURE 3 in order that they need not be shown in FIGURE 1.

The walls of each opening 100 are spaced from the tube 14, as seen in top plan view.

Each attachment element 42 has a tube connection portion 140 which is attached to the tube 14 by any suitable means such as welding 146 at the edges of the 140.

Each attachment element 42 has a pipe interconnection section 160 provided with a pair of vertically spaced ears 164 best seen in FIGURE 3, having aligned vertical apertures 170 therethrough which are actually parts of the opening 100.

The tube is provided with an annular riser connection section mounted on and welded to the upper side thereof and having a threaded opening 210 therethrough disposed in communication with the interior of the tube 14 whereby a sprinkling riser pipe, not shown, can be threadedly mounted in the riser connection section 200.

A brace 230 is provided having one end 232 attached to the riser connection section 200 at a point spaced above the tube. The brace 230 extends toward an adjacent end of the tube and is there attached by suitable means, such as welding 232'.

The brace 230 has a hook-receiving opening 260 therethrough, that is, extending vertically therethrough and adapted to receive the end of a handling hook 264, shown in dotted lines in FIGURE 2, an edge 270 of the slot-receiving opening disposed adjacent the opposite end of the hook-receiving opening from the riser connection section is spaced upwardly from the tube 14, and an area 280 under the brace 230 and disposed on the opposite side of the edge 270 from the riser connection section 200 is spaced from the tube 14 for receiving the tip end 280 of the handling hook 264 thereunder.

Another brace 290 extends forwardly to the tube from the irrigation riser pipe receiving section 200 and the braces 230 and 290 effectively brace the section 200.

As thus described, this invention is believed to fulfill the objectives above set forth in providing a more efficient and economical coupler for irrigation pipe.

It will be understood that this invention can be changed from the form illustrated within the protective scope of the following claim.

We claim:

1. An irrigation pipe and coupler assembly comprising an elongated coupler tube having right and left sides, a top side and open ends, an annular riser connection section mounted on said top side of said coupler tube, means forming an opening through said coupler tube providing access from the inside of the said coupler tube to the inside of said riser connection section, whereby a sprinkler riser pipe can be mounted in said riser connection section, irrigation pipes having ends extending into the ends of said coupler tube, sealing means engaging between each of said pipe ends and said coupler ends, means at each end of said coupler and on each of said pipe ends for attaching said coupler to the respective pipe ends, said attachment means comprising two attachment assemblies, said two attachment assemblies being disposed one on said right side and one on said left side respectively of said coupler tube and said respective pipe ends, each attachment assembly having a connection portion permanently attached to said coupler tube and another connection portion permanently attached to the respective side of the respective pipe ends, said tube and pipe connection portions of each attachment assembly being in overlapping relationship and having an aperture therethrough extending transversely of the elongation of said tube, the apertures of said tube and pipe connection portions being aligned, each connection assembly having a pin removably disposed through said aligned apertures whereby insertion of said pin into said apertures makes a rapid connection and the removal of said pin makes a rapid disconnection, the bottom side of said tube being free of such connection asemblies, and wherein said tube member has a thin wall of substantially the same thickness throughout the length of the tube and brace means rigidly attached to said riser connection section at points spaced above said coupler tube, said brace means extending forwardly and rearwardly along said top side of said coupler and being rigidly fixed to said coupler topside at points axially spaced from said annular riser connection for effectively bracing said irrigation riser connection.

References Cited

UNITED STATES PATENTS

| | | | |
|---|---|---|---|
| 2,097,374 | 10/1937 | Kennedy | 285—23 X |
| 2,262,627 | 11/1941 | Whitesell et al. | 285—404 X |
| 2,677,560 | 5/1954 | Cornelius | 285—5 |
| 2,702,717 | 2/1955 | Cornelius | 285—5 X |
| 2,898,741 | 8/1959 | Milliken | 285—39 X |
| 2,916,305 | 10/1959 | Sherman | 285—5 |

FOREIGN PATENTS

| | | |
|---|---|---|
| 205,622 | 11/1956 | Australia. |
| 539,045 | 7/1955 | Belgium. |
| 1,202,038 | 7/1959 | France. |
| 1,226,525 | 2/1960 | France. |
| 957,176 | 1/1957 | Germany. |

CARL W. TOMLIN, *Primary Examiner.*

EDWARD ALLEN, *Examiner.*

RICHARD G. BERKLEY, *Assistant Examiner.*